US011249485B2

United States Patent
Tong et al.

(10) Patent No.: US 11,249,485 B2
(45) Date of Patent: Feb. 15, 2022

(54) METHOD AND SYSTEM FOR CONTROLLING AN AUTONOMOUS VEHICLE DEVICE TO REPEATEDLY FOLLOW A SAME PREDETERMINED TRAJECTORY

(71) Applicant: Siemens Industry Software NV, Leuven (BE)

(72) Inventors: Son Tong, Leuven (BE); Van Lanh Nguyen, Hanoi (VN)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 0 days.

(21) Appl. No.: 17/058,636

(22) PCT Filed: May 30, 2018

(86) PCT No.: PCT/EP2018/064238
§ 371 (c)(1),
(2) Date: Nov. 24, 2020

(87) PCT Pub. No.: WO2019/228626
PCT Pub. Date: Dec. 5, 2019

(65) Prior Publication Data
US 2021/0208596 A1     Jul. 8, 2021

(51) Int. Cl.
*G05D 1/02*     (2020.01)
*B62D 15/02*     (2006.01)

(52) U.S. Cl.
CPC .......... *G05D 1/0221* (2013.01); *B62D 15/02* (2013.01); *G05D 2201/0213* (2013.01)

(58) Field of Classification Search
CPC ......... G05D 1/0221; G05D 2201/0213; B62D 15/02
See application file for complete search history.

(56) References Cited

U.S. PATENT DOCUMENTS 10,829,149 B1 * 11/2020 Garimella ............. B60W 60/00
2015/0329140 A1   11/2015 Tamaizumi
(Continued)

FOREIGN PATENT DOCUMENTS

| CN | 105035090 A | 11/2015 |
|---|---|---|
| CN | 107161207 A | 9/2017 |

(Continued)

OTHER PUBLICATIONS

International Preliminary Report on Patentability for International Patent Application PCT/EP2018/064238 dated Apr. 24, 2020.
(Continued)

*Primary Examiner* — Peter D Nolan
*Assistant Examiner* — Demetra R Smith-Stewart
(74) *Attorney, Agent, or Firm* — Lempia Summerfield Katz LLC (57) ABSTRACT

A method for controlling an autonomous vehicle to repeatedly follow a same predetermined trajectory comprises: a) receiving a target trajectory signal indicative of the predetermined trajectory; b) generating a control signal adapted to steer the vehicle along the predetermined trajectory; and, for at least one of a number of iterations: c) steering the vehicle along the predetermined trajectory by feeding the control signal to the vehicle; d) measuring an actual trajectory followed by the vehicle in response to being steered according to the control signal; e) recording an actual trajectory signal indicative of the measured actual trajectory; f) using an iterative learning controller to determine an altered control signal using the control signal, the actual trajectory signal and the target trajectory signal. The method allows to improve a tracking performance during a subsequent iteration.

10 Claims, 2 Drawing Sheets

(56) References Cited

U.S. PATENT DOCUMENTS

| | | | |
|---|---|---|---|
| 2018/0196436 A1* | 7/2018 | Gupta | G05D 1/0212 |
| 2018/0356819 A1* | 12/2018 | Mahabadi | B60W 30/09 |
| 2019/0066397 A1* | 2/2019 | Du | G01R 31/006 |
| 2019/0072965 A1* | 3/2019 | Zhang | G05D 1/0088 |
| 2019/0072966 A1* | 3/2019 | Zhang | G08G 1/166 |
| 2019/0129831 A1* | 5/2019 | Goldberg | G06F 3/04847 |
| 2019/0152490 A1* | 5/2019 | Lan | B60W 30/0956 |
| 2019/0161080 A1* | 5/2019 | Gochev | G08G 1/164 |
| 2019/0346851 A1* | 11/2019 | Liu | B60W 60/00276 |
| 2020/0026296 A1 | 1/2020 | Hoedt | |
| 2020/0159225 A1* | 5/2020 | Zeng | G05D 1/0088 |
| 2020/0278686 A1* | 9/2020 | Liu | G05D 1/0221 |

FOREIGN PATENT DOCUMENTS

| | | |
|---|---|---|
| DE | 102016219594 A1 | 4/2018 |
| JP | H06127407 A | 5/1994 |
| JP | H07186990 A | 7/1995 |
| JP | H09252608 A | 9/1997 |
| JP | 2009280097 A | 12/2009 |
| JP | 2015217793 A | 12/2015 |

OTHER PUBLICATIONS

Kapania, Nitin R., and J. Christian Gerdes. "Path tracking of highly dynamic autonomous vehicle trajectories via iterative learning control." 2015 American Control Conference (ACC). IEEE, 2015.

Manoharan, P. S., T. Rajkamal, and M. Willjuice Iruthayarajan. "Tracking Trajectory Using Iterative Learning Control." 2011 International Conference on Process Automation, Control and Computing. IEEE, 2011.pp. 1-5.

Rosolia, Ugo, Ashwin Carvalho, and Francesco Borrelli. "Autonomous racing using learning model predictive control." 2017 American control conference (ACC). IEEE, 2017. pp. 1-8.

Chinese Office Action for Chinese Application No. 201880093874.2 dated Jun. 1, 2021.

Japanese Notice of Allowance for Japanese Patent Application No. 2021-517108 dated Oct. 12, 2021, with English translation.

* cited by examiner

METHOD AND SYSTEM FOR CONTROLLING AN AUTONOMOUS VEHICLE DEVICE TO REPEATEDLY FOLLOW A SAME PREDETERMINED TRAJECTORY

This application is the National Stage of International Application No. PCT/EP2018/064238, filed May 30, 2018. The entire contents of this document is hereby incorporated herein by reference.

BACKGROUND

The present embodiments relate to the field of autonomous driving, and more particularly, to a method and a system for controlling an autonomous vehicle device to repeatedly follow a same predetermined trajectory.

Control methods such as proportional integral derivative (PID) control, state-space control, feedback control, and model predictive control (MPC) have been used to control an autonomous vehicle to follow a desired trajectory.

In scenarios such as home or valet parking into a predetermined parking lot, autonomous lap races, and the like, an autonomous vehicle is repeatedly controlled to follow a same predetermined trajectory, such as a trajectory into a specified parking lot or a trajectory around a lap.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a performance when controlling an autonomous vehicle to repeatedly follow a same predetermined trajectory is improved.

According to a first aspect, a method for controlling an autonomous vehicle device to repeatedly follow a same predetermined trajectory includes: a) receiving a target trajectory signal indicative of the predetermined trajectory; and b) generating a control signal adapted to steer the autonomous vehicle device along the predetermined trajectory. The method further includes, for at least one of a number of iterations: c) steering the autonomous vehicle device along the predetermined trajectory by feeding the control signal to the autonomous vehicle device; d) measuring an actual trajectory followed by the autonomous vehicle device in response to being steered according to the control signal; e) recording an actual trajectory signal indicative of the measured actual trajectory; and f) using an iterative learning control device to determine an altered control signal based on at least the control signal, the actual trajectory signal, and the target trajectory signal.

The method allows to leverage Iterative Learning Control (ILC) to improve a tracking performance of the autonomous vehicle device during a subsequent iteration of steering the autonomous vehicle device along the same predetermined trajectory.

A "tracking performance" may, for example, be a tracking error or deviation between the predetermined trajectory and the actual trajectory, and "optimizing the tracking performance" may refer to reducing the tracking error.

The autonomous vehicle device may be an actual autonomous vehicle. The autonomous vehicle device may also be a simulated model of a vehicle. "Autonomous", as used herein, may refer to the ability of the autonomous vehicle device to follow the predetermined trajectory without human intervention.

The term "signal" may refer to a time-series of readings or values. The time-series may be continuous or discrete. A discrete time-series may be equidistant or non-equidistant. In the control signal, the values may include acceleration and steering angle. In a respective trajectory signal, the values may include two- or three-dimensional coordinates. A respective signal may further include a time code indicative of a time for each value.

The predetermined trajectory may be a desired path or route that the vehicle is expected to follow. Examples for the predetermined trajectory are a trajectory from an entrance of a valet parking lot (e.g., start point) to a predetermined parking space (e.g., end point), or a trajectory around, or from a starting line (e.g., start point) to a finishing line (e.g., end point) of a lap of a racing site.

In act a), the predetermined trajectory may be received, for example, from a stationary control unit, such as a parking lot controller and/or a racing site controller, and/or from an on-board control unit of the autonomous vehicle, such as an in-car navigation controller, and/or from a mobile device.

In act b), the control signal adapted to steer the autonomous vehicle device along the predetermined trajectory may be generated by detecting and recording a time series of control inputs, such as acceleration and steering angle, provided to the car by a human driver, a PID controller, or the like in response to receiving the target trajectory signal. Alternatively, the control signal may be generated by calculation.

The phrase "to steer/steering the autonomous vehicle device along the predetermined trajectory" herein may refer to controlling the autonomous vehicle device so as to follow, or move/drive along, an actual trajectory that may deviate from the predetermined trajectory by an allowable tracking error.

A "number of iterations" may refer to a number of one or more.

A respective iteration may refer to a respective instance of steering the autonomous vehicle device from the start point of the predetermined trajectory to the end point along the predetermined trajectory according to a respective control signal. Specifically, in a first iteration, acts c), d), e), and f) may be performed in response to the control signal generated in act b). In any further iteration, acts c), d), e), and f) may be performed in response to the altered control signal generated in act f) as the control signal.

Feeding the control signal to the autonomous vehicle device in act c) may refer to repeatedly, for each of a plurality of time instances, providing a respective of the values comprised by the control signal to the autonomous vehicle device, such as to a steering device of the autonomous vehicle device.

Likewise, the measuring in act d) and the recording in act e) may also be performed repeatedly for at least some of the plurality of time instances. In other words, acts d) and e) may be performed in parallel to and/or synchronous with act c).

The measuring of act d) may refer to using a location device such as a GPS receiver, using radio communication with sign posts distributed along the predetermined trajectory or the like, to acquire two-dimensional and or three-dimensional coordinate values.

In act e), recording may refer to forming a signal from a plurality of the values measured in act d) for a plurality of the time instances.

In act f), the iterative learning control device may be a device configured to use Iterative Learning Control (ILC) to provide an altered (e.g., updated, improved, optimized) control signal for a subsequent iteration based on the control signal and the actual trajectory signal (e.g., recorded actual trajectory signal) of a current iteration.

More particularly, "based on the control signal and the target trajectory signal" may provide "based on an actual tracking error signal indicative of a tracking error between the actual trajectory signal and the target trajectory signal". The actual tracking error signal may be obtained by subtracting the actual trajectory signal from the target trajectory signal. "Tracking error" may refer to a deviation, such as an averaged or root mean square distance, between the respective signals. "Based on a signal", may, for example, refer to "using the signal as an input".

Still more particularly, the iterative learning control device may be configured to iteratively learn, by being used repeatedly for each of the iterations, an optimum control signal that optimizes the tracking performance. For example, optimizing the tracking performance may refer to reducing or minimizing the actual tracking error signal (e.g., an energy content, time average value, or root mean square thereof).

Specifically, "learning" may refer to repeatedly altering (e.g., updating, optimizing) data stored in the iterative learning control device, such as a parameter, operator, or control model.

It is noted that act f) is in no way limited to an embodiment where a respective value of the control signal, a corresponding value of the actual trajectory signal, and a corresponding value of the target value signal are used to determine a corresponding value of the altered control signal, where all values are values related to a same time instance.

Rather, act f) may operate using entire signals. In other words, each of the values of the altered control signal for each time instance of the plurality of time instances may be determined depending on a portion corresponding to a range of time instances or to all of the time instances of a time series of each of the control signal, the actual trajectory signal, and the target value signal and/or the actual tracking error signal.

According to an embodiment, act e) includes recording the actual trajectory signal in a memory device while the autonomous vehicle device is being steered, and at least act f) is carried out after the autonomous vehicle device has been steered in act c). In other words, the iterative learning control device may be used off-line (e.g., after steering the autonomous vehicle device along the predetermined trajectory has been completed), so as to prepare for a subsequent iteration of steering the autonomous vehicle device along the predetermined trajectory.

As compared to time-critical on-line operation, off-line operation of the iterative learning control device may offer the advantage of being able to use a more sophisticated control algorithm (e.g., more sophisticated parameters, operators, or a more sophisticated and computing-intensive control model) in the iterative learning control device. Thereby, it may be possible to further optimize the tracking performance.

For example, the actual trajectory signal may be recorded by storing, for each of the at least some of the plurality of time instances for which the actual trajectory is measured, a position value (e.g., coordinate values) in the memory device.

The memory device may be a volatile or a non-volatile memory, such as a RAM, a flash memory, a hard disk drive, and the like.

According to a further embodiment, the method further includes using the altered control signal as the control signal for a subsequent iteration of the number of iterations.

By repeatedly using the altered control signal as the control signal for a subsequent iteration of the number of iterations of act c) to f), after a number of the iterations, an optimum control signal to maximize the tracking performance may be determined.

A "subsequent iteration" may refer to a next iteration that follows immediately after the current iteration and/or may refer to a next-but-one or to any further subsequent iteration that is carried out at a later time than the current iteration.

Acts of a plurality of the iterations may partly overlap. For example, in a case where a subsequent iteration of steering the vehicle along the predetermined trajectory follows immediately after a current iteration, as for example in a lap race, the next iteration that follows immediately after the current iteration may use the same control signal u that was used for the current iteration, and the altered control signal uu determined in act f) may be provided not to the next iteration, but to a subsequent iteration that follows after the next iteration (e.g., next-but-one iteration).

By parallelizing act f) and acts c), d), e) in this way, off-line iterative learning control with a sophisticated model may be used even in a lap race scenario.

According to a further embodiment, the iterative learning control device includes a control model adapted to generate a predicted trajectory signal from a control signal, and act f) includes: f1) altering the control model based on the control signal and the actual trajectory signal; and f2) altering the control signal based on the altered control model.

In other words, the altered output signal is determined based on the control signal, the actual trajectory signal, the target trajectory signal, and the altered model.

In other words, the control method according to the present embodiment may be described as a combination of feedback control, model-based control, and learning control. This combination may be advantageous in that the tracking performance may be further optimized.

For example, in act f1), the control model may be altered based on information about the autonomous vehicle device that is derivable from the control signal and the actual trajectory signal.

Act f1) may thus be described as a learning step in which the control model learns new information about the autonomous vehicle device, and act f2) may be described as an application step in which the learned information is used to determine an altered control signal while applying the learned in formation.

According to a further embodiment, act f1) includes altering the control model so as to reduce a deviation between the actual trajectory signal and the predicted trajectory signal generated by the control model from the control signal.

Thereby, the control model comprised by the iterative learning controller is optimized to more accurately predict the actual trajectory signal.

Specifically, act f1) may include solving an optimization problem. The optimization problem may constitute in determining altered parameters of the control module that reduce or minimize the deviation. A minimum may be a local minimum or a global minimum.

According to a further embodiment, act f2) includes altering the control signal so as to reduce a deviation between the predicted trajectory signal, generated by the altered control model from the altered control signal, and the target trajectory signal.

Thereby, the predicted tracking error (e.g., deviation between the predicted trajectory signal and the target trajectory signal) of a subsequent iteration conducted using the altered control signal is reduced. Thus, an actual tracking error of the subsequent iteration may be reduced as well. Specifically, act f2) may include solving an optimization problem. The optimization problem may be to determine an altered control signal that reduces or minimizes the deviation. A minimum may be a local minimum or a global minimum.

According to a further embodiment, the altering performed in act f1) and/or in act f2) is performed under a constraint imposed on the autonomous vehicle device.

An example for a constraint may be a maximum steering angle, a maximum acceleration, and the like. The constraint may be applied when solving a respective optimization problem.

Thereby, the altered control signal may be adjusted to properties and/or a desired behavior of the autonomous vehicle device.

According to a further embodiment, act d) includes determining an actual parameter related to the actual trajectory. The control model is further adapted to generate a predicted parameter related to the predicted trajectory. Act f1) includes altering the control model so as to reduce a deviation between the actual parameter and the predicted parameter generated by the control model; and/or act f2) includes altering the control signal so as to reduce a deviation between the predicted parameter generated by the control model and a predetermined parameter target. A respective parameter related to a respective trajectory is a parameter indicative of a physical property of the respective trajectory and/or the autonomous vehicle device and/or a behavior thereof when following the respective trajectory.

Thereby, "optimizing the tracking performance" may not just refer to reducing a tracking error or deviation between the positional coordinates of the actual trajectory and the coordinates of the predetermined trajectory. Rather, a deviation between any desired parameter related to the respective trajectories may be reduced. The desired parameter may be one of tracking error, fuel consumption, wear of a part of the vehicle, total driving time, and the like.

According to embodiments where act f) includes solving an optimization problem, a deviation that is desired to be reduced as much as possible may be set as an objective function of the optimization problem, while a deviation that is desired not to exceed a certain maximum limit may be set as a constraint when solving the optimization problem. For example, the fuel consumption may be used as objective function, and the tracking error may be used as a constraint to optimize for fuel consumption. Alternatively, the fuel consumption may be used as a constraint, and the tracking error may be used as objective function to optimize for accuracy of tracking.

According to a further embodiment, the predicted parameter related to the predicted trajectory and the actual parameter related to the actual trajectory each are indicative of at least one of a time used by the autonomous vehicle device for following the respective trajectory and an amount of fuel consumed by the autonomous vehicle device while following the respective trajectory.

For example, the respective parameter may be indicative of the time or fuel used while following a predetermined portion of the respective trajectory, such as from a start point of the respective trajectory to an end point of the respective trajectory.

According to a further embodiment, in act f1) and/or in act f2), the control model and/or the control signal is altered in a number of iterations.

In other words, an optimization problem solved in act f1) and/or act f2) may be a non-analytical problem. Solving the non-analytical optimization problem may involve iteratively solving the optimization problem. Iteratively solving may include using a steepest descent method or the like. The iterations may be repeated until a respective deviation is below a predetermined threshold value and/or until a respective deviation changes less than a predetermined threshold between consecutive iterations and/or until a steepest gradient is below a predetermined threshold. In other words, the iterations may be repeated until convergence at a global or local minimum is attained.

Thereby, a sophisticated control model may be used that may not be solvable analytically and may require iterative solution to further improve the tracking performance.

According to a further embodiment, the autonomous vehicle device is an autonomous motor vehicle.

Herein, "autonomous" may refer to a fully autonomous motor vehicle, a semi-autonomous motor vehicle, or a conventional motor vehicle equipped with driving assistance functionality.

The autonomous motor vehicle may be a car such as an electric car, a hybrid car, an internal combustion engine car, and the like.

The control method according to the present embodiment may be performed whenever the car is steered along a same predetermined trajectory. For example, the car may be provided with a target trajectory signal by an automated parking lot or a racing site in act a). In response to the target trajectory signal, a human or a PID controller may generate a control signal to steer the car along the target trajectory in act b). The car may then be steered along the target trajectory according to the control signal and an actual trajectory of the car is recorded in acts c), d), and e). Thereafter, act f) may be executed to improve the tracking performance. The next time the car is provided with the same target trajectory, the car may repeat acts c) to e) to autonomously steer the car along the target trajectory with improved tracking performance and act f) to further improve the tracking performance. Thereby, over time, by employing iterative learning control, the number of steering operations, the time used, and/or the amount of fuel consumed for steering the car along the predetermined trajectory may be optimized (e.g., reduced).

According to a further embodiment, the autonomous vehicle device is a simulator device configured to simulate a motor vehicle under design.

The motor vehicle under design may be an autonomous vehicle or a conventional vehicle; in the latter case, "autonomous" in "autonomous vehicle device" may relate to the fact that the simulator device (e.g., but not necessarily the final motor vehicle) may be operated automatically without human intervention.

The simulator device may be embodied in software and/or hardware. For example, the simulator device may be a high-fidelity vehicle dynamic model created using a simulation software such as Siemens Imagine. Lab Amesim.

An engineer may use a control method of the present embodiments to repeatedly simulate steering the simulated motor vehicle along a predetermined trajectory and to determine an optimum control input for the steering. This may allow the engineer to evaluate the vehicle dynamic model's optimum performance. The engineer may then alter the simulator device (e.g., alter the model of the motor vehicle under design) and repeat the process, until a model with desired properties is achieved.

Thus, the method of the present embodiments may be used with advantage as an aid in early-stage motor vehicle development.

According to a further embodiment, act b) includes generating the control signal from control input obtained by manually and/or autonomously steering the autonomous vehicle device.

The control input may be, for example, steering angle and acceleration.

"Manually steering" may refer to steering by a human driver.

"Autonomously steering", when referring to act b), may refer to steering using an autonomous driving control method such as proportional integral derivative (PID) control, state-space control, feedback control, or model predictive control (MPC).

Any embodiment of the first aspect may be combined with any embodiment of the first aspect to obtain another embodiment of the first aspect.

According to a second aspect, the present embodiments relate to a computer program product including a program code for executing the above-described method for controlling an autonomous vehicle device when run on at least one computer.

A computer program product, such as a computer program means, may be embodied as a memory card, USB stick, CD-ROM, DVD, or as a file that may be downloaded from a server in a network. For example, such a file may be provided by transferring the file including the computer program product from a wireless communication network.

According to a third aspect, a system for controlling an autonomous vehicle device to repeatedly follow a same predetermined trajectory includes a first device configured to a) receive a target trajectory signal indicative of the predetermined trajectory, and a second device configured to b) generate a control signal adapted to steer the autonomous vehicle device along the predetermined trajectory. The system also includes a third device configured to, for at least one of a number of iterations, c) steer the autonomous vehicle device along the predetermined trajectory by feeding the control signal to the autonomous vehicle device, d) measure an actual trajectory followed by the autonomous vehicle device in response to being steered according to the control signal, and e) record an actual trajectory signal indicative of the measured actual trajectory. The system includes a fourth device configured to, for the at least one of a number of iterations, f) use iterative learning control to determine an updated control signal based on at least the control signal, the actual trajectory signal, and the target trajectory signal.

The embodiments and features described with reference to the method of the first aspect apply mutatis mutandis to the system of the further aspect. The system of the third aspect may be implemented to execute the method of the first aspect or the method of any of the embodiments of the first aspect.

The respective device (e.g., the first device, the second device, the third device, and/or the fourth device) may be implemented in hardware and/or in software. If the device is implemented in hardware, the device may be embodied (e.g., as a computer or as a processor or as a part of a system, such as a computer system). If the device is implemented in software, the may be embodied as a computer program product, as a function, as a routine, as a program code, or as an executable object.

Further possible implementations or alternative solutions of the present embodiments also encompass combinations of features described above or below with regard to the embodiments that are not explicitly mentioned herein. The person skilled in the art may also add individual or isolated aspects and features to the most basic form of the invention.

DETAILED DESCRIPTION

In the figures, like reference numerals designate like or functionally equivalent elements, unless otherwise indicated.

Figure 1:
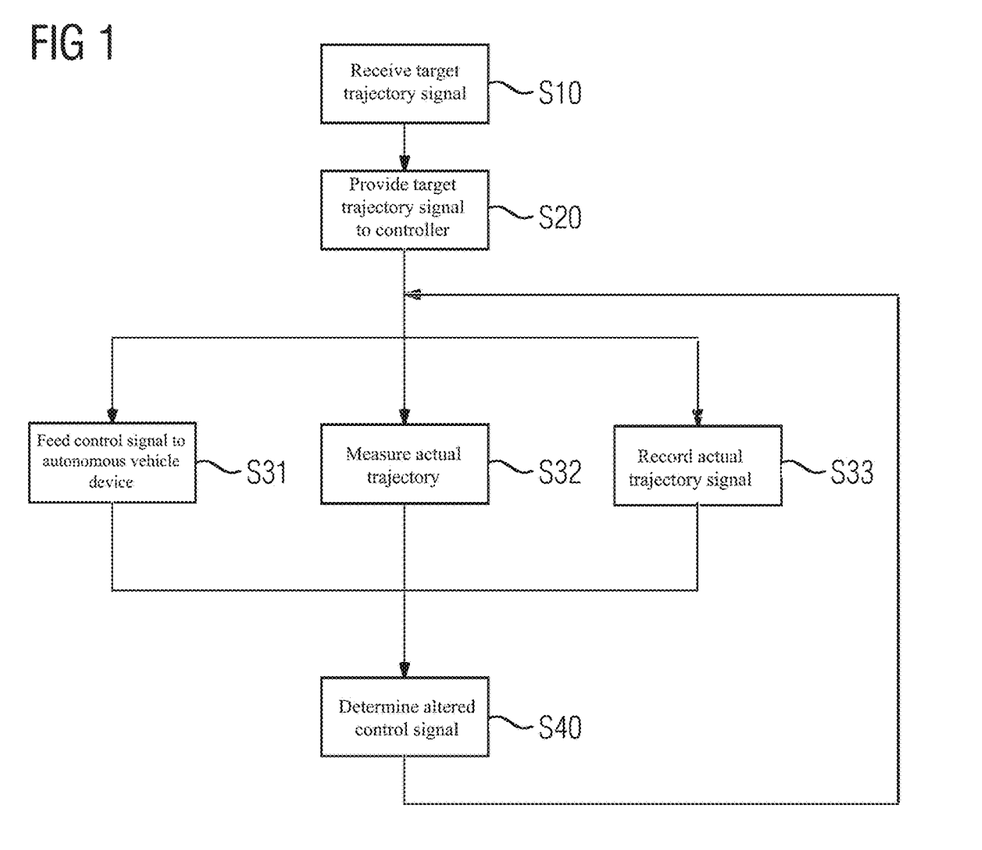
FIG. 1 shows a flowchart illustrative of a method according to a first embodiment.
Figure 2:
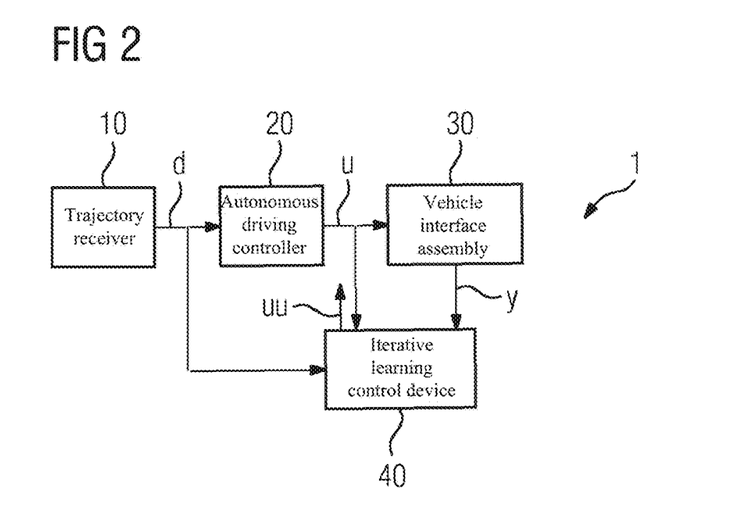
FIG. 2 shows a block diagram illustrative of a system according to the first embodiment.

FIG. 1 shows a flow chart illustrative of a method according to a first embodiment for controlling an autonomous vehicle device to repeatedly follow a same predetermined trajectory ("control method" hereinbelow). FIG. 2 shows a block diagram illustrative of one embodiment of a system 1 for controlling an autonomous vehicle device to repeatedly follow a same predetermined trajectory ("control system" hereinbelow) according to the first embodiment. Reference will be made to FIG. 1 and FIG. 2.

The control system 1 includes a trajectory receiver 10 (e.g., a first device), an autonomous driving controller 20 (e.g., a second device), a vehicle interface assembly 30 (e.g., a third device), and an iterative learning control device 40 (e.g., a fourth device).

The control system 1 is associated with (e.g., installed in or communicatively connected to) an autonomous vehicle device such as an autonomous car ("car" hereinbelow; not shown).

In act S10 of the control method, the trajectory receiver 10 receives a target trajectory signal d from an external entity (not shown) such as, for example, a transmitter installed at a valet parking lot (not shown). The target trajectory signal d indicates a predetermined trajectory that the car is expected to follow. Merely as an example, the predetermined trajectory may be a trajectory leading from an entrance of the valet parking lot to a predetermined parking space of the valet parking lot.

In act S20 of the control method, the autonomous driving controller 20 is provided with the target trajectory signal d. The autonomous driving controller 20 may be a PID controller in the present embodiment. Details of the PID control are omitted for brevity. In response to being provided with the target trajectory signal d, the autonomous driving controller generates a control signal u and provides the control signal u to the vehicle interface assembly 30.

In response to being provided with the control signal u, the vehicle interface assembly 30 performs the following the three acts S31, S32, and S33.

In act S31, the control signal u is fed to the autonomous vehicle device. Thereby, the autonomous vehicle device is steered along the predetermined trajectory.

In act S32, an actual trajectory followed by the autonomous vehicle device in response to being steered according to the control signal u is measured.

In act S33, an actual trajectory signal y indicative of the measured actual trajectory is recorded.

The vehicle interface assembly 30 provides the actual trajectory signal y to the iterative learning control device 40. Likewise, the control signal u and the target trajectory d are also provided to the iterative learning control device 40.

In act S40, the iterative learning control device 40 uses iterative learning control (ILC) to determine an altered control signal uu based on the control signal u, the actual trajectory signal y and the target trajectory signal d.

Acts S31, S32, S33, and S40 thus constitute a first iteration in which the vehicle has been steered along the predetermined trajectory from a start point to an end point thereof in act S31, an actual trajectory has been measured in act S32, an actual trajectory signal y has been recorded in act S33, and an altered control signal uu has been determined in act S40 based on the actual trajectory signal y, the target trajectory signal d and the controls signal u.

Thereby, during the first iteration, an altered control signal uu has been determined in which, for example, a tracking performance of the automated vehicle may have been improved by Iterative Learning Control.

According to a variant, after act S40, the altered control signal uu may be fed back to the vehicle interface assembly 30 to be used as the control signal u during one of one or more subsequent iterations of acts S31, S32, S33 and S40.

Figure 3:
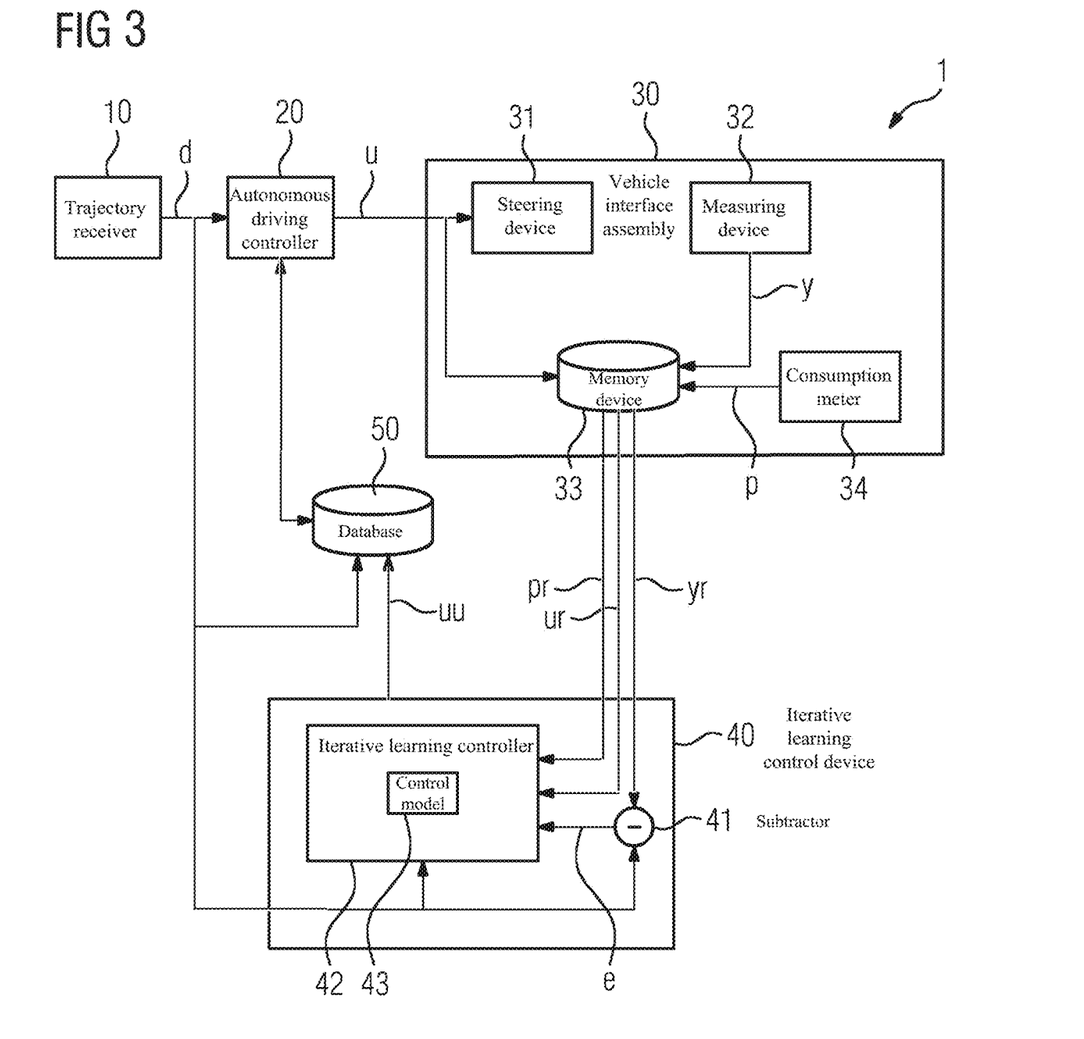
FIG. 3 shows a block diagram illustrative of a system according to a second embodiment.

FIG. 3 shows a block diagram illustrative of a control system 1 according to a second embodiment. The following description focuses on differences between the control system of FIG. 3 and the control system 1 of FIG. 1. Reference will be made to FIG. 3 and FIG. 1.

In addition to the trajectory receiver 10, the autonomous driving controller 20, the vehicle interface assembly 30, and the iterative learning control device 40, the system 1 of FIG. 3 further includes a database 50.

The database 50 is configured to store a plurality of control signals and target trajectory signals in association with each other. The vehicle interface assembly 30 includes a steering device 31, a measuring device 32, a memory device 33, and a consumption meter 34. The consumption meter may include a fuel gauge.

The iterative learning control device 40 includes a subtractor 41 and an iterative learning controller 42. The iterative learning controller 42 includes a control model 43.

The system 1 according to the second embodiment may operate in the following manner.

In act S10, the trajectory receiver 10 receives a target trajectory signal d from the external entity. The target trajectory signal d includes a series of target position values d(k), with k=1 . . . K, where k is a discretization index such as a discretized time, and K is the total number of values comprised by the target trajectory signal d. The trajectory receiver 10 provides the target trajectory signal d(k), with k=1 . . . K, to the autonomous driving controller 20 to be used for generating the control signal u as described hereinbelow, to the database 50 to be stored therein in association with an altered control signal uu as described hereinbelow, and to the iterative learning control device 40 to be used to determine a predicted tracking error signal and an actual tracking error signal e.

The autonomous driving controller 20 may be configured to generate, in act S20, the control signal u to be supplied to the vehicle interface assembly 30 in one of two manners.

Specifically, the autonomous driving controller 20 is communicatively coupled to the database 50. Upon receiving the target trajectory signal d, the autonomous driving controller 20 may query the database 50 to determine whether the database 50 stores a control signal in association with the target trajectory signal d (or a control signal u stored in association with a target trajectory signal indicative of a same predetermined trajectory as the target trajectory signal d).

If the database 50 includes a control signal u stored in association with the target trajectory signal d, the autonomous driving controller 20 may know that a subsequent iteration of steering the car along the predetermined trajectory indicated by the target trajectory signal d is desired. In this case, the stored control signal may be an altered (e.g., updated, improved, optimized) control signal uu for steering the car along the predetermined trajectory indicated by the trajectory signal d. Thus, the autonomous driving controller 20 may generate the control signal u by supplying the control signal uu that is stored in the database 50 in association with the target trajectory signal d as the control signal u to the vehicle interface assembly 30.

If the database 50 does not include a control signal stored in association with the target trajectory signal d, the autonomous driving controller 20 may uses PID control or the like to generate the control signal u and supply the control signal u to the vehicle interface assembly 30.

In the vehicle interface device 30, in response to being supplied with the control signal u, the following acts are performed.

To steer the car along the predetermined trajectory in act S31, for each discretized time k, a corresponding value u(k) of the control signal u is supplied to the steering device 31. The value u(k) may include an acceleration and a steering angle. The value u(k) is further provided to the memory device 33 to be stored therein. Thereby, the control signal u may be recorded in the memory device 33.

While the car is steered along the predetermined trajectory, for each discretized time k, the measuring device 32 measures current coordinates of the actual trajectory followed by the car in response to being steered according to the control signal u in act S32. The current coordinates are provided to the memory device 33 to be stored therein. Thereby, an actual trajectory signal y may be recorded in the memory device 33 (act S33, FIG. 1).

Further, a parameter p indicative of an amount of fuel consumed by the car while following the actual trajectory (e.g., one example for an actual parameter related to the actual trajectory) is stored in the memory 33. The parameter p is determined and updated by the fuel gauge 34 in regular intervals, such as for each discretized time k.

After steering the car along the predetermined trajectory has been completed (e.g., when the discretized time K has been reached), the recorded control signal ur (k), with k=1 . . . K, the recorded actual trajectory signal yr(k), with k=1 . . . K, and the recorded actual parameter pr are provided to the iterative learning control device 40.

More specifically, the recorded actual trajectory signal yr may be provided to the subtractor 41 of the iterative learning control device 40. The target trajectory signal d may also be provided to the subtractor 41. The subtractor 41 may subtract the recorded actual trajectory signal yr(k) from the target trajectory signal d(k) to achieve an actual tracking error signal e(k). The actual tracking error signal e(k), with k=1 . . . K, may be provided to the iterative learning controller 42 along with the recorded control signal ur (k) and the recorded parameter pr.

The iterative learning controller 42 includes a control model 43 of a controlled system including the car.

Specifically, in act S40, the iterative learning controller 42 may determine an altered control signal uu(k) using the control model 43 by evaluating a learning function f. The learning function f may be a function of the actual tracking error e(k), the recorded actual control signal ur(k), and the recorded parameter signal pr: uu(k)=f[ur(k), e(k), pr], with k=1 . . . K For example, the function f may be a non-analytical function.

Specifically, evaluating the function f may include learning processing, in which the control model 43 is altered based on knowledge learned from the actual tracking error signal e(k), the recorded actual parameter signal pr(k), and the actual control signal ur(k). Evaluating the function f may further include optimization processing, in which an altered control signal uu(k) is determined based on the altered control model 43 altered in the learning processing.

The optimization problem may include an objective function and a constraint. The objective function may be to reduce a tracking error, and the constraint may be a maximum allowable fuel consumption. Conversely, the objective function may be to reduce the fuel consumption, and the constraint may be a maximum allowable tracking error.

When the altered control signal uu(k) has been determined in this way, the altered control signal uu(k) is provided to the database 50 and stored therein in association with the target trajectory signal d(k).

In this way, the altered control signal uu(k) is made available for use by the autonomous driving controller 20 during subsequent iterations in which the trajectory receiver 10 receives the same target trajectory signal d(k).

Thereby, a tracking performance, such as tracking error experienced, fuel consumed, or time used by the vehicle when following the same predetermined trajectory, may be iteratively improved over subsequent iterations.

A variant of the second embodiment will now be used to describe a variant of act S40 in more detail.

According to a variant of the second embodiment, the control model 43 may be configured to generate a predicted trajectory signal based on a control signal provided to the control model 43. The control model 43 may be further configured to generate a predicted parameter based on the control signal.

In other words, according to a variant, the iterative learning controller 42 may perform the following acts to evaluate the learning function f using the control model 43 in act S40.

In a first sub-act f1), which is an example for the learning processing mentioned above, the iterative learning controller 42 may alter the control model 43 in a number of iterations. In each iteration, the iterative learning controller 42 may use the control model 43 to determine a predicted trajectory signal yp(k) and a predicted parameter pp based on the recorded control signal ur(k).

Herein, the predicted parameter pp may be a predicted amount of fuel consumed by the car while following the predicted trajectory indicated by the predicted trajectory signal yp(k) (one example for a predicted parameter related to the predicted trajectory).

In the respective iterations, the iterative learning controller 42 may alter the control model 43 according to an iterative optimization strategy such as a method of steepest descent. An objective function of the optimization strategy may be to reduce or minimize a deviation between the predicted trajectory yp(k) and the recorded trajectory yr(k) and/or to reduce or minimize a deviation between the predicted parameter pp and the recorded parameter pr.

It is noted herein, that reducing a deviation between the predicted trajectory signal yp(k) and the recorded trajectory signal yr(k) may be functionally equivalent to reducing a deviation between a predicted tracking error signal determined by subtracting the predicted trajectory signal yp(k) from the target trajectory signal d(k) and the actual tracking error signal e(k). The subtractor 41 may be used to determine the predicted tracking error signal, although this is not shown explicitly in FIG. 3.

The iterative learning controller 42 may alter the control model 43 by altering one or more parameters thereof. The iterative learning controller 42 may continue to iteratively alter the control model 43 until convergence of the deviation at a local or global minimum is attained.

In other words, in the learning processing of the first sub act f1), the iterative learning controller 42 may solve an optimization problem so as to bring the control 43 model in better agreement with an observed behavior of the controlled system including the car, which is modeled by the control model 43. Herein, the observed behavior may be indicated by the recorded control signal ur(k), the recorded parameter pr, and the recorded actual trajectory signal yr(k) (e.g., the actual tracking error signal e(k)).

In a second sub-act f2) of act S40, the iterative learning controller 42 may iteratively determine an altered control signal uu(k). Specifically, the iterative learning controller 42 may first use the recorded control signal ur(k) as the altered control signal uu(k) and iteratively alter the altered control signal uu(k) in a number of iterations.

In each iteration, the iterative learning controller 42 may use the altered control model 43 to determine a predicted target trajectory yp(k) and a predicted parameter pp based on the current altered control signal uu(k).

In the respective iterations, the iterative learning controller 42 may alter the altered control signal uu(k) according to an iterative optimization strategy such as a method of steepest descent. An objective function of the optimization strategy may be to reduce or minimize a deviation between the predicted trajectory yp(k) and the desired target trajectory d(k) (e.g., reducing or minimizing a tracking error), and/or to reduce or minimize a deviation between the predicted parameter pp and a predetermined parameter target. Specifically, the predetermined parameter target may be an allowable maximum total fuel consumption.

The iterative learning controller 42 may continue to iteratively alter the control model 43 until convergence of the deviation at a local or global minimum is attained.

Herein, if the deviation to be minimized is selected to be the deviation between the predicted trajectory yp(k) and the target trajectory d(k), the iterative learning controller 42 effectively optimizes a predicted tracking error (an example for a predicted tracking performance to be optimized). If the deviation to be minimized is selected to be the deviation between the predicted parameter pp and the predetermined parameter target, the iterative learning controller 42 effectively optimizes a predicted parameter related to the predicted trajectory such as a predicted amount of fuel consumed by the car when following the predicted trajectory (another example for a predicted tracking performance).

While optimizing a predicted tracking error, an allowable maximum fuel consumption may be considered as a constraint when altering the altered control signal uu(k). Conversely, when optimizing a predicted fuel consumption, an allowable maximum tracking error may be considered as a constraint when altering the altered control signal uu(k).

Further constraints considered when altering the altered control signal uu(k) may be constraints that are imposed by properties of the car, such as an allowable maximum steering angle, or an allowable maximum acceleration.

In other words, in the optimization processing of the second sub-act f2), the iterative learning controller 42 may solve an optimization problem so as to determine an altered control signal uu(k) that is expected, based on predictions generated by the altered control model 43, to yield an improved or optimized tracking performance (e.g., minimum tracking error or minimum fuel consumption) under a predetermined set of constraints.

In this way, when act S40 is carried out after the car has been steered along the predetermined trajectory indicated by the received target trajectory signal d(k), in act f1), the control model 43 is altered by learning, and in act f2), the control signal is altered by optimizing a predicted tracking performance.

By repeatedly carrying out act S40 in each of the iterations (e.g., iterations where the car is steered along the same predetermined trajectory, such as, according to acts S31, S32, and S33, FIG. 1), an actual tracking performance may be improved over subsequent iterations through iterative learning.

Although the present invention has been described in accordance with exemplary embodiments, it is obvious for the person skilled in the art that modifications are possible in all embodiments.

The embodiments have been described mainly in view of a valet parking scenario; however, the teachings disclosed are equally applicable to a lap racing scenario, a home parking scenario, and any other scenario in which an autonomous vehicle device is repeatedly steered along a same predetermined trajectory.

The embodiments have been described in view of an autonomous motor vehicle such as a car as an example of the autonomous vehicle device. However, the teachings disclosed are equally applicable to a development scenario in which the autonomous vehicle device is a simulator device configured to simulate a motor vehicle under design.

The parameter related to a trajectory is not limited to an amount of fuel consumed, but may also include an amount of wear exerted on a part of the vehicle, a time used to complete steering of the car from a start point to an end point of the predetermined trajectory, and the like.

According to the second embodiment, a plurality of target trajectory signals and associated altered control signals may be stored in the database 50. In one embodiment, the database 50 may also store a plurality instances of the control model 43 each associated with one of the target trajectory signals. Herein, an instance of the control model may be, for example, a set of model parameters. More precisely, for each execution of act S40, the iterative learning control device S40 may load the corresponding instance of the control model 43, which corresponds to a current target trajectory signal, into the iterative learning controller 42, before executing the learning processing and the optimizing processing of act S40, and may write the altered control model 43 (e.g., instance thereof) back to the database 50 upon completion of act S40. In other words, different instances of the control model 43 may be taught (e.g., altered) in accordance with different target trajectory signals (e.g., different driving scenarios).

However, the database 50 is a non-limiting optional feature, and direct feedback of the altered control signal uu to the vehicle interface 30 for a subsequent interface is also contemplated. An embodiment without database 50 may be used beneficially in a lap racing scenario where the autonomous vehicle is repeatedly stored along a same lap and optimizing of the tracking performance takes place throughout the race. After the race is finished, the learned information is no longer required, and therefore, there is no need to store such information in a database. Portions of, or all of, acts S31, S32, S33, and S40 may be parallelized at the discretion of the skilled person.

The various signals described in the second embodiment, such as the actual trajectory signal y and the desired signal d, do not necessarily need to be parametrized using a same discretization index k, but may each be parametrized using different discretizations.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for controlling an autonomous vehicle device to repeatedly follow a same predetermined trajectory, the method comprising:
   receiving a target trajectory signal indicative of a predetermined trajectory;
   generating a control signal adapted to steer the autonomous vehicle device along the predetermined trajectory; and
   for at least one of a number of iterations:
      steering the autonomous vehicle device along the predetermined trajectory, the steering of the autonomous vehicle device comprising feeding the control signal to the autonomous vehicle device;
      measuring an actual trajectory followed by the autonomous vehicle device in response to being steered according to the control signal, wherein measuring the actual trajectory comprises determining an actual parameter related to the actual trajectory;
      recording an actual trajectory signal indicative of the measured actual trajectory; and
      determining, using an iterative learning control device, an altered control signal based on at least the control signal, the actual trajectory signal, and the target trajectory signal,
   wherein the iterative learning control device comprises a control model configured to generate a predicted trajectory signal from a control signal and generate a predicted parameter related to a predicted trajectory,
   wherein the determining of the altered control signal comprises:
      altering the control model based on the control signal and the actual trajectory signal; and
      altering the control signal based on the altered control model, wherein altering the control model comprises altering the control model so as to reduce a deviation between the actual trajectory signal and the predicted trajectory signal generated by the control model from the control signal, wherein altering the control signal comprises altering the control signal so as to reduce a deviation between the predicted trajectory signal, generated by the altered control model from the altered control signal, and the target trajectory signal, and wherein the predicted parameter related to the predicted trajectory and the actual parameter related to the actual trajectory are each indicative of at least one of a time used by the autonomous vehicle device for following the respective trajectory and an amount of fuel consumed by the autonomous vehicle device while following the respective trajectory.

2. The method of claim 1, wherein recording the actual trajectory signal comprises recording the actual trajectory signal in a memory device while the autonomous vehicle device is being steered, and wherein the determining of the altered control signal is carried out after the autonomous vehicle device has been steered.

3. The method of claim 1, further comprising:

using the altered control signal as the control signal for a subsequent iteration of the number of iterations.

4. The method of claim 1, wherein the altering of the control model, the altering of the control signal, or the altering of the control model and the altering of the control signal are performed under a constraint imposed on the autonomous vehicle device.

5. The method of claim 1, wherein altering the control model comprises altering the control model so as to reduce a deviation between the actual parameter and the predicted parameter generated by the control model, altering the control signal comprises altering the control signal so as to reduce a deviation between the predicted parameter generated by the control model and a predetermined parameter target, or a combination thereof, and wherein a respective parameter related to a respective trajectory is a parameter indicative of a physical property of the respective trajectory, the autonomous vehicle device, a behavior thereof, or any combination thereof when following the respective trajectory.

6. The method of claim 1, wherein altering the control model, altering the control signal, or altering the control model and altering the control signal comprises altering the control model, altering the control signal, or altering the control model and altering the control signal in a number of iterations.

7. The method of claim 1, wherein the autonomous vehicle device is an autonomous motor vehicle.

8. The method of claim 1, wherein the autonomous vehicle device is a simulator device configured to simulate a motor vehicle under design.

9. The method of claim 1, wherein generating a control signal comprises generating the control signal from control input obtained by manually, autonomously, or manually and autonomously steering the autonomous vehicle device.

10. A system for controlling an autonomous vehicle device to repeatedly follow a same predetermined trajectory, the system comprising:

a first device configured to receive a target trajectory signal indicative of the predetermined trajectory;

a second device configured to generate a control signal adapted to steer the autonomous vehicle device along the predetermined trajectory; and a third device configured to, for at least one of a number of iterations:

feed the control signal to the autonomous vehicle device, such that the autonomous vehicle device is steered along the predetermined trajectory;

measure an actual trajectory followed by the autonomous vehicle device in response to being steered according to the control signal, wherein measuring the actual trajectory comprises determining an actual parameter related to the actual trajectory; and record an actual trajectory signal indicative of the measured actual trajectory; and a fourth device configured to, for the at least one of the number of iterations, determine, using iterative learning control, an updated control signal based on at least the control signal, the actual trajectory signal, and the target trajectory signal, wherein the iterative learning control device comprises a control model configured to generate a predicted trajectory signal from a control signal and generate a predicted parameter related to a predicted trajectory, wherein the determination of the altered control signal comprises:

alteration of the control model based on the control signal and the actual trajectory signal; and alteration of the control signal based on the altered control model, wherein the alteration of the control model comprises alteration of the control model so as to reduce a deviation between the actual trajectory signal and the predicted trajectory signal generated by the control model from the control signal, wherein the alteration of the control signal comprises alteration of the control signal so as to reduce a deviation between the predicted trajectory signal, generated by the altered control model from the altered control signal, and the target trajectory signal, and wherein the predicted parameter related to the predicted trajectory and the actual parameter related to the actual trajectory are each indicative of at least one of a time used by the autonomous vehicle device for following the respective trajectory and an amount of fuel consumed by the autonomous vehicle device while following the respective trajectory.

* * * * *